(12) United States Patent
James

(10) Patent No.: US 11,191,314 B2
(45) Date of Patent: Dec. 7, 2021

(54) SCENTED CLIP

(71) Applicant: Birdie Everything LLC, Leesburg, VA (US)

(72) Inventor: Robyn Dolores James, Leesburg, VA (US)

(73) Assignee: BIRDIE EVERYTHING LLC, Leesburg, VA (US)

( * ) Notice: Subject to any disclaimer, the term of this patent is extended or adjusted under 35 U.S.C. 154(b) by 0 days.

(21) Appl. No.: 16/878,497

(22) Filed: May 19, 2020

(65) Prior Publication Data

US 2020/0367592 A1 Nov. 26, 2020

Related U.S. Application Data

(60) Provisional application No. 62/850,277, filed on May 20, 2019.

(51) Int. Cl.
| | |
|---|---|
| *A42B 1/24* | (2021.01) |
| *A45F 5/02* | (2006.01) |
| *C11B 9/00* | (2006.01) |
| *F16B 2/20* | (2006.01) |
| *A63B 57/30* | (2015.01) |

(52) U.S. Cl.
CPC ............ *A42B 1/24* (2013.01); *A45F 5/02* (2013.01); *C11B 9/0061* (2013.01); *F16B 2/20* (2013.01); *A45F 2200/05* (2013.01); *A63B 57/353* (2015.10); *A63B 2209/08* (2013.01)

(58) Field of Classification Search
CPC .. C11B 9/0061; F16B 2/20; F16B 2001/0035; A45F 5/02; A63B 2209/08; Y10T 24/13; Y10T 24/1394; A41F 1/002; A44D 2203/00

USPC .............................................. 239/36, DIG. 11
See application file for complete search history.

(56) References Cited

U.S. PATENT DOCUMENTS

| | | | | |
|---|---|---|---|---|
| 3,529,328 | A * | 9/1970 | Davison .................. | D06F 55/00 24/303 |
| 5,682,653 | A * | 11/1997 | Berglof ..................... | G09F 1/10 24/303 |
| 8,308,118 | B2 * | 11/2012 | Sheffield ................. | F16B 47/00 248/309.3 |
| 9,500,209 | B2 * | 11/2016 | Bonno ....................... | A45F 5/00 |
| 2002/0073516 | A1 * | 6/2002 | Behar ..................... | A47B 21/06 24/306 |
| 2009/0283197 | A1 * | 11/2009 | Gorodisher ........ | B65D 33/1658 156/60 |
| 2010/0083699 | A1 * | 4/2010 | Conigliaro ........... | A44C 15/003 63/1.18 |
| 2019/0350318 | A1 * | 11/2019 | Levine ................... | A47K 10/02 |

OTHER PUBLICATIONS

Wissal Dhifi et al., "Essential Oils' Chemical Characterization and Investigation of Some Biological Activities: A Critical Review", Medicines, 3.4, Sep. 2016, pp. 1-16.

* cited by examiner

*Primary Examiner* — Robert Sandy
(74) *Attorney, Agent, or Firm* — Resolute Legal PLLC

(57) ABSTRACT

The present disclosure provides for multifunction clips that can secure useful tools as well as include aromatic compounds that can repel insects, deodorize, or provide a pleasing aroma to a user.

18 Claims, 8 Drawing Sheets

SCENTED CLIP

CROSS REFERENCE TO A RELATED APPLICATION

This application claims priority to U.S. Provisional Application No. 62/850,227, filed on May 20, 2019. The contents of the above document are incorporated herein by reference in its entirety.

FIELD

The present disclosure relates to clips.

BACKGROUND

During various outdoor activities, bugs or unpleasant smells may be present. For example, when on a golf course, bugs are often a problem that plague golfers. Golfers have tried numerous ways to deter bugs, such as by using bug sprays, dryer sheets, and even smoke. Often a golfer may be hesitant to use certain bug sprays on their hat for fear of the chemicals in the bug spray mixing with sweat on their hats and dripping into their eyes or ruining their hat.

The above information disclosed in this Background section is only for enhancement of understanding of the background of the disclosure.

DETAILED DESCRIPTION

Figure 1A:
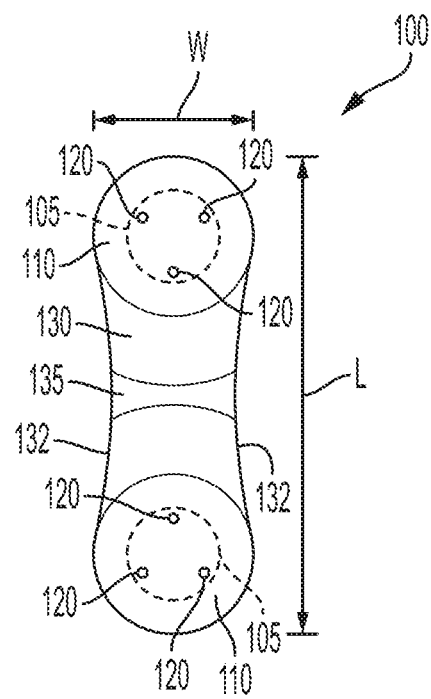
FIG. 1A is a top view showing one example implementation of a clip.

Various implementations of a clip are described more fully hereinafter with reference to the accompanying drawings. The clip may, however, be embodied in many different forms and should not be construed as limited to the example implementations set forth herein. Rather, these example implementations are provided so that this disclosure is thorough to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A clip according to some implementations includes a flexible body that may be secured to a separate structure or body, such as hats, belts, other types of clothing, or other suitable objects. In some implementations, the clip includes two or more magnets to secure the clip to the separate body. In some implementations, the clip can be secured to the separate body using other suitable mechanisms, such as a pin, spring clamp, hook and loop, adhesives, etc. In some implementations, the body of the clip may be formed from a polymeric material, such as rubber, elastomer, or plastic. In some implementations, the body of the clip may be formed from some other suitable flexible material such as cloth. In some implementations, the clip may removably secure other items such as golf ball markers, fish hooks, lights, writing instruments, or other suitable items while the clip is also removably secured to a separate structure.

In some implementations, the body of the clip includes one or more magnets. In some implementations, the body of the clip includes one or more magnets embedded in opposite ends thereof with opposing polarities. When the opposite ends of the body of the clip are bent towards each other, the opposing polarities of the magnets cause the clip to form a clamp for securing to the separate body. In some implementations, one or more of the magnets of the clip may help secure a golf ball marker to the clip (e.g., where the golf ball marker includes ferromagnetic material).

In some implementations, the material used to form the clip body may be infused with one or more organic and/or inorganic compounds. In some implementations, the outer layer of the clip body may be coated to form a thin film of one or more organic and/or inorganic compounds. In some implementations, the thin film is connected to the outer layer of the clip body. In some implementations, the thin film is on or directly connected to the outer layer of the clip body. In some implementations, the organic or inorganic compounds include scented and/or aromatic compounds. In some implementations, the clip body may be infused with one or more scented and/or aromatic compounds and also include a thin film of one or more scented and/or aromatic compounds. In some implementations, the one or more scented and/or aromatic compounds may include essential oils or other substances or ground plant matter. In some implementations, the one or more scented and/or aromatic compounds may have insect repellent properties or aromas that are desirable to humans. It should be appreciated as used herein, the term essential when referencing essential oils should not be construed as limiting, rather the phrase essential oil should be construed as a natural oil typically obtained by distillation and having the characteristic fragrance of the plant or other source from which it is extracted.

Figure 1B:
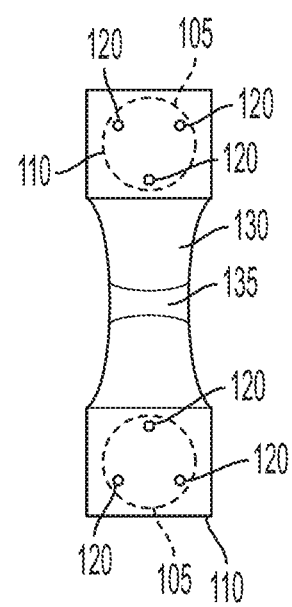
FIG. 1B is a top view showing one example implementation of a clip.
Figure 3:
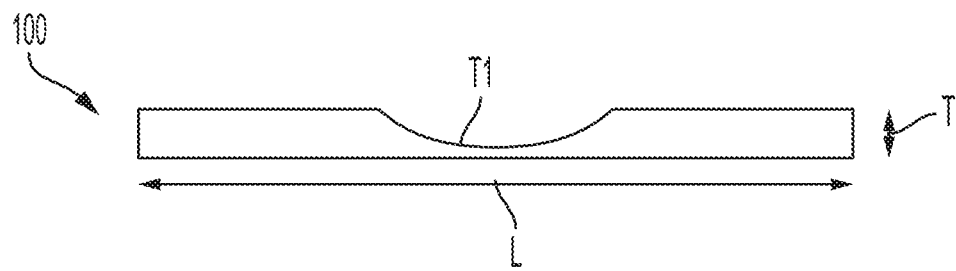
FIG. 3 is a side view of one example implementation of the clip.
Figure 12:
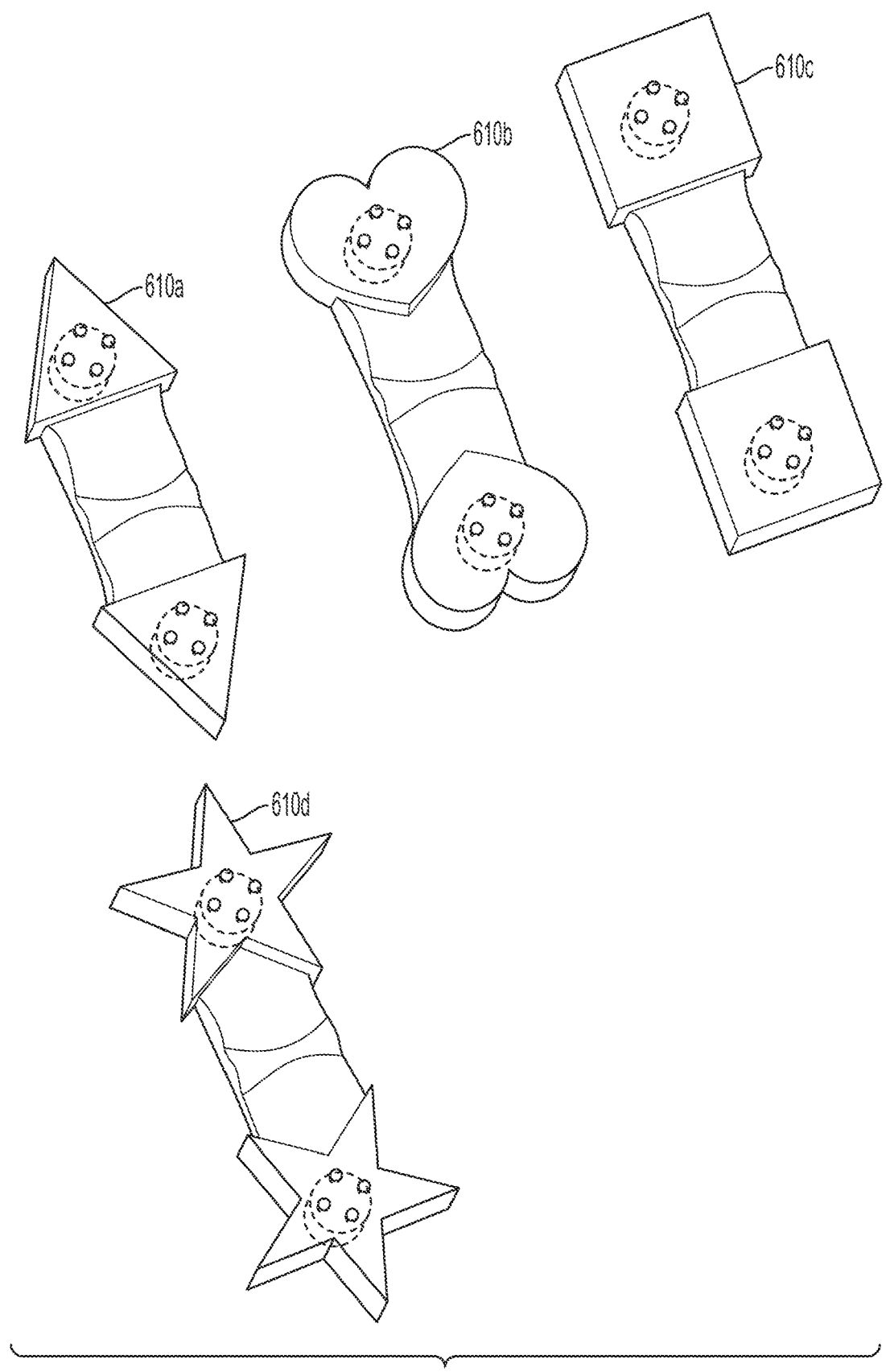
FIG. 12 are example implementations of various clips formed in different shapes.

In some implementations, as shown in FIG. 1A, clip 100 may include at least two clip heads 110. In some implementations, the clip 100 may include more than two clip heads 110. In some implementations, the clip 100 may include one or more magnets 105 disposed within each of the clip heads 110. In some implementations, the clip 100 has a length L of about 59 mm to 60 mm and a width W of about 20 mm. In various implementations, the clip 100 can have any suitable length L and any suitable width W. In some implementations, the clip heads 110 may have a diameter of about 18.5 mm to 20 mm; provided however, clip heads 110 may have any other suitable diameters. In some implementations, the clip heads 110 can be different sizes (e.g., one clip head 110 can be a different size then an opposing clip head 110). In some implementations, the clip heads 110 can be formed in different shapes, such as shown in FIG. 1B and FIG. 12. In some implementations, as shown in FIG. 3, a clip head 110 may be formed with a thickness T of about 4 mm to 5.5 mm. However, it should be appreciated that the clip head can be any suitable thickness. In some implementations, as shown in FIG. 3, a clip head 110, the thickness T may include a tapering or sloped area T1 that is also described in connection with FIG. 1A as relief 135. In some implementations, the thickness T to the thinnest section of T1 may range from 4 mm down to 1.2 mm. In some implementations, the thinnest section of T1 may range from 1.2 mm-1.8 mm. It should be appreciated that thickness of T1 may vary to other suitable thicknesses depending on the property of the materials used to form clip 100.

Figure 2:
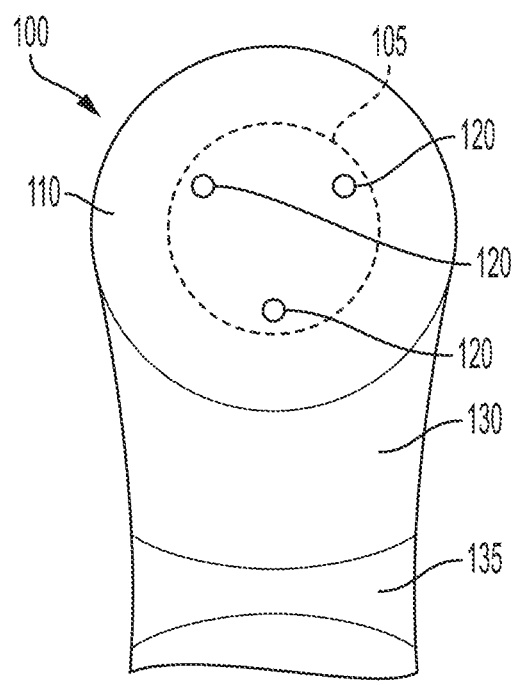
FIG. 2 is a close-up top view of one example implementation of the clip.

In some implementations, a clip head 110 may include one or more divots 120 disposed therein. In some implementations, the divots are small indentations in the surface of the clip head 110. In various implementations, the divots can be formed in any suitable shape. In some implementations, a clip head 110 may include three divots 120. In some implementations, a clip head 110 may include four divots 120. In some implementations, the divots 120 create variations in the surface texture to provide additional grip when the clip 100 is attached to a separate body or structure (e.g., an article of clothing). In some implementations, a divot 120 is about 2 mm in diameter; provided however, a divot 120 may be any suitable diameter. In some alternative implementations, a divot 120 does not include a diameter when the divot is in a different shape (e.g., a cube). In some implementations, the divots 120 on a clip head 110 are disposed in a triangle arrangement, substantially equidistant from each other, as shown in greater detail in FIG. 2. It should be appreciated that the divots 120 can be disposed in any suitable arrangement with respect to each other. In some implementations, the divots 120 may be disposed within a 5 mm radius from the center of the clip head 110. In some implementations, a divot 120 is also respectively substantially equidistant from the outer peripheral side of the clip head 110. In some implementations, the clip heads 110 do not include divots 120.

In some implementations, a clip head 110 includes one or more magnets 105 disposed within material forming the clip head 110. A side profile view of some implementations of magnets 105 disposed within clip 100 can be seen in FIG. 8. In some implementations, the polarity of a first magnet 105 on a first one of the clip heads 110 is a first polarity and a second magnet 105 of a second one of the clip heads 110 is a second polarity. In some implementations, the first polarity and the second polarity are different polarities to ensure that the face of the first magnet 105 is attracted to the face of the second magnet 105. Thus, when the clip 100 is folded such that the faces of clip heads 110 are brought together, the clip 100 forms a clamp. When such a clamp formed from the clip 100 is positioned around an article of clothing, such as the brim of a hat, the clip 100 can be secured to the hat. The magnets 105 enable the clip heads 110 of the clip 100 to be separated to removably detach the clip 100 from the hat. While magnets 105 are disclosed as housed within the clip heads 110, in some implementations, the magnets can be fixedly attached to the outside of the clip heads. As noted above, in some implementations, the clip 100 includes other attachment devices in lieu of magnets 105 (e.g., pins, hook and loop fasteners, adhesives, etc.). In some implementations, the clip 100 includes other attachment devices in addition to magnets 105. In some implementations, one of the clip heads 110 may include a magnet while the other one of the clip heads 110 does not include a magnet. However, in some such implementations, the other one of the clip heads 110 without a magnet may alternatively include one or more pieces of ferromagnetic material to attract the magnet disposed in the other clip head 110. In some implementations, the magnets 105 can be neodymium magnets; provided however, other suitable magnets can be used.

Figure 9:
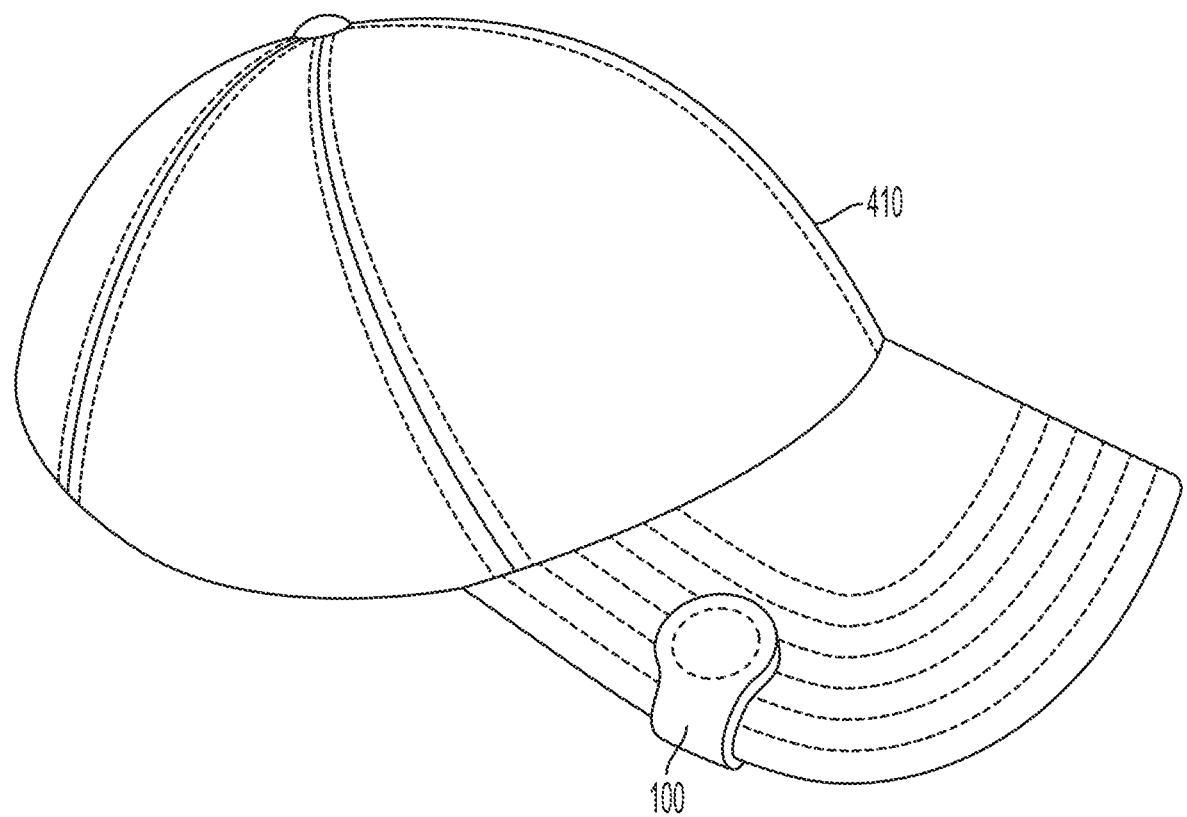
FIG. 9 is an isometric view of one example implementation of a clip secured to an article of clothing.

In some implementations, the magnets 105 can be used to attach other objects to clip 100. For example, when clip 100 is folded and attached to a brim of a hat, the outer surface (such as illustrated in FIG. 9) of a clip head 110 is useful to hold objects, such as ball markers. The ball markers can include magnetic or ferrous material that can be attached to the outer surface of a clip head 110 of the clip 100. Objects can also be attached to the outer surface of clip 100 in other suitable ways (e.g., with adhesives, hook and loop, etc.). In some implementations, magnets 105 are not visible within clip 100 (e.g., magnets 105 may be substantially covered with a material used to form the clip). In some implementations, magnets 105 may be at least partially visible within clip 100 (e.g., magnets 105 may be substantially covered with a material used to form the clip 100. In some implementations, the material used to form the clip 100 may be at least partially translucent enabling the magnet 105 to be at least partially visible within clip 100. In some implementations, magnet 105 may be at least partially exposed while embedded within clip 100. For example, magnet 105 may be partially exposed on either the top or bottom of clip 100 (e.g., partially exposed at the visible surface shown from the perspective of FIG. 1A or partially exposed at the visible surface shown from the perspective of FIG. 4). In some implementations, at least some portions of the top and the bottom of one or more of the magnets 105 can be exposed while embedded within clip 100.

Figure 4:
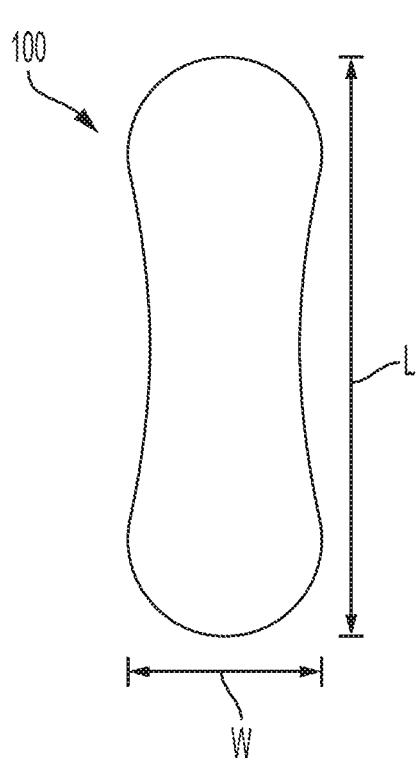
FIG. 4 is a bottom view of one example implementation of the clip.

In some implementations, the clip 100 has a connection part 130 extending between each clip head 110. In some implementations, the connection part 130 has a thickness that decreases between the clip heads 110. In some implementations, the connection part 130 decreases in thickness as it extends away from each clip head 110. In some implementations, the decreasing thickness is on one side of the connection part 130 of clip 100 (e.g., the visible side in FIG. 1A). In some implementations, the decreasing thickness causes one side of the connection part 130 of the clip 100 to favor folding in a particular direction (e.g., the visible faces of clip heads 110 in FIG. 1A fold toward each other, which folding is further aided by the magnets 105). In some implementations, the connection part 130 may include concave, inwardly curved sides 132 extending between the clip heads 110. In some implementations, a relief 135 is disposed around the midpoint of the connection part 130, the relief 135 having the smallest thickness in the clip 100. An example relief 135 is further illustrated in FIG. 7. In some implementations, the relief 135 further promotes the proper curvature (e.g., folding) of the clip 100, and helps ensure the clip 100 does not become stretched and damaged with repeated flexing and bending. In some implementations, the bottom of the clip 100 is substantially planar and uniform, as shown in FIG. 4. In some implementations, the decreasing thickness occurs on both sides of the connection part 130 (not shown). In some such implementations, the clip 100 may not favor folding in either direction when the decreasing thickness occurs on both sides. In some implementations, the connection part 130 can be uniform in thickness. In some implementations, where the connection part 130 is uniform in thickness, the connection part 130 can be the same thickness as the clip heads 110. In some implementations, where the connection part 130 is uniform in thickness, the connection part 130 can be thinner or thicker than the clip heads 110.

The clip 100, according to some implementations, may be folded at the relief 135, and the clip heads 110 may be attracted to and connect with each other due to the magnets 105 embedded therein. When the clip 100 is folded, the clip heads 110 may be disposed on either side of an article, such as clothing or a hat, and remain substantially affixed thereto. For example, the clip 100 may be affixed to a hat having a thickness of about 5 mm (or other suitable thickness). In some implementations the clip 100 is formed from a flexible and curable polymeric material, such as rubber, elastomer, or plastic, that may be bent or folded repeatedly without failing or fracturing. In some implementations, the clip 100 can be formed from alternative materials such as fabric, cardboard, or paper. In some implementations, the clip 100 is formed using a mold. In some implementations, the clip 100 is formed using a mold and an alignment jig. In some implementations, the mold is formed as an inverse of the shape of the clip 100. The mold can be formed from one or more different materials. In some implementations, the mold can be formed from a polymer. In some implementations, the mold can be formed from medium density fiberboard. In some implementations, the mold can be formed from plastics, metal, or other suitable material. A further discussion of some possible implementations of a mold to make clip 100 and the process and system to make the mold can be found in connection with FIG. 11 and FIG. 12 below.

In some implementations, a mixture of uncured polymeric material is poured into the mold and allowed to cure. In some implementations where magnets 105 are used in the clip heads 110, magnets may be placed in the mold prior to adding material to form the clip 100, where the material is poured into the mold and envelops the magnets 105. In some implementations, magnets 105 can be added to the mold while adding other material to form the clip 100. In some implementations, magnets 105 can be added to the mold after adding the material to form the clip 100 (e.g., magnets 105 can be added to the uncured material in the mold).

In some implementations where magnets 105 are placed in the mold prior to adding the material for the clip 100, magnets 105 are set on a surface to the underside of the mold in order to properly orient them. In some implementations, the mold includes one or more partial spherical shapes protruding from the surface of the mold where the clip heads 110 are formed. In some implementations, the partial spherical shapes are oriented in the shape shown by divots 120 in FIG. 1A, FIG. 1B, and FIG. 2. In some implementations, the partial spherical shapes on the mold cause the magnets 105 to be raised above the surface of the mold where the clip heads 110 are formed (e.g., when the magnets 105 are placed on the partial spherical shapes). In some implementations, raising the magnets 105 off the surface of the mold enables material poured into the mold to flow under the magnets 105 to ensure that the magnets 105 are substantially encased in the materials used to form the clip 100. In some implementations, the magnets 105 have a thickness of about 1 mm, so the uncured polymeric material may flow around the magnets and throughout the entire mold. In some implementations, magnets 105 have a thickness of about 3 mm and a diameter of about 15 mm. In some implementations, the magnets can be any suitable thickness and diameter. In one example implementation, the polymeric material is a silicone or a silicone-urethane elastomer, such as Simpact∩60a. It should be appreciated that other suitable polymeric materials or other materials can be used to form the clip 100. In some implementations, the clip 100 can be formed using other suitable methods and other suitable materials. For example, the clip 100 can be formed using injection molding.

In some implementations, the material used to form the clip 100 can be infused with scented compounds. In some implementations, scented compounds, such as essential oils, can be added to the uncured material used to form the clip 100. For example, in some implementations, one drop of essential oil or essential oil mixture may be added to uncured material used to form the clip 100 (e.g., polymeric material) and blended together, where a ratio of about 0.01 oz of essential oil or a mixture thereof is mixed in about 2.0 oz of the uncured material. In some implementations, the concentration of essential oil in the polymeric material is about 0.5% (wt/wt). As used herein, the term "essential oil" refers to a concentrated hydrophobic liquid containing volatile chemical compounds obtained from plants. In some implementations, volatile chemical compounds may have a low molecular weight below 300 and belong to various chemical classes of alcohols, ethers or oxides, aldehydes, ketones, esters, amines, amides, phenols, heterocycles, and terpenes. In some implementations, if more than a predetermined quantity of essential oil is added to such uncured material, the uncured material may fail to properly cure. Certain essential oils, such as eucalyptus, may inhibit curing of certain materials used to form the clip 100, and therefore may not be appropriate as an additive to the materials. In addition, if an additive such as pigment or glitter is desired, such additives can be added to the uncured mixture and blended together. The uncured material used to form the clip 100 can then be poured into a mold and allowed to sufficiently cure.

Figure 8:
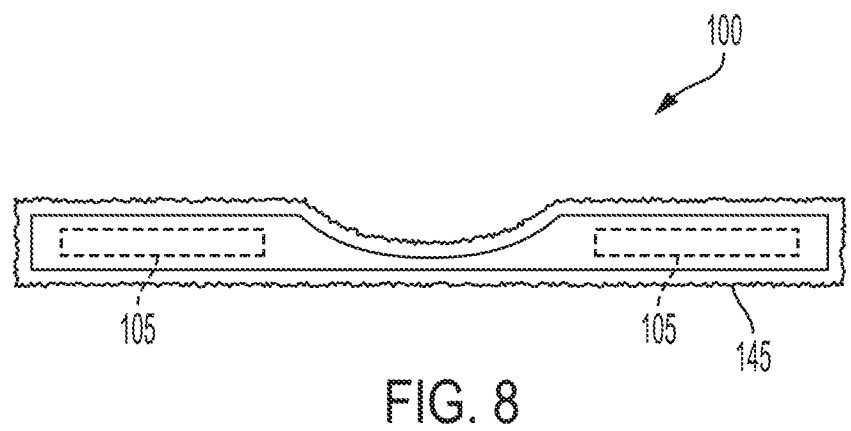
FIG. 8 is a side view showing one example implementation of a clip having a thin film.

In some implementations, a thin film 145 as illustrated in FIG. 8 can be added to clip 100. In some implementations, the thin film 145 can be in addition to the scented compounds that were added during the clip 100 forming process. In some implementations, the thin film 145 can be an alternative to adding scented compounds to clip 100 during the clip 100 forming process (e.g., scented compounds are not added to the uncured polymeric materials used to form the clip 100). In some implementations, once clip 100 is cured sufficiently, the thin film 145 can be added to clip 100. In some implementations, the thin film 145 can be added to clip 100 even before clip 100 has cured, to the extent that the thin film 145 does not interfere with the curing process. In some implementations, the thin film 145 is added to clip 100 by soaking clip 100 in a thin film solution with scented or aromatic compounds for a predetermined period of time. In some implementations, the thin film solution may include a ratio of oil mixed with scented or aromatic compounds. In some implementations, the thin film solution may include a ratio of oil mixed with a first scented or aromatic compound. In some implementations, the first scented or aromatic compound may include ground tree bark (e.g., cassia bark or cinnamon). In some implementations, the thin film solution may include a ratio of oil mixed with one or more scented or aromatic compounds. For example, in some implementations, the thin film solution may include a mixture of about 200 grams of oil (e.g., grape seed oil or some other suitable oil), about 5 grams of cinnamon bark powder (e.g., cassia bark powder or other suitable compound), and about 10 grams of vanillin powder (e.g., a ratio of 2:1 of vanillin powder to cinnamon bark powder). This ratio of cassia bark powder and vanillin powder, when provided as a thin film on clip 100, unexpectedly provided a stronger repelling effect to one or more insects such as gnats than using cassia bark powder alone. Moreover, the higher ratio of vanillin to cinnamon bark powder further enhanced the repelling effect to one or more insects than when lower quantities of vanillin are used. It should be appreciated that the thin film solution mixture ratio described herein is merely an example, and other suitable other ratios and other suitable compounds can be used to accomplish a specific purpose (e.g., insect repellent, aromatherapy, deodorant, odor masking, etc.) for thin film 145.

In some implementations, the thin film 145 is formed on clip 100 by submerging clip 100 in the thin film solution and soaking clip 100 for a predetermined period of time. In some implementations, the predetermined period of time is 48 hours. It should be appreciated that the predetermined period of time can be other suitable periods of time depending on the compounds in the thin film solution. In some implementations, the clip 100 can be rotated and/or flipped in the thin film solution after being submerged in the thin film solution to ensure adequate coverage or adherence to the surface of clip 100. In some implementations, the clip 100 is rotated or flipped after about 24 hours of being submerged in the thin film solution. It should be appreciated that clip 100 can be rotated or flipped in the thin film solution at other suitable time frames. In some implementations, after clip 100 has remained in the thin film solution for a predetermined period of time (e.g., 48 hours or other suitable time), clip 100 is removed and dried (e.g., passively or mechanically), leaving the thin film 145 on the surface and/or on the subsurface of clip 100. In some implementations, excess thin film solution on clip 100 can be mechanically removed (e.g., with air, heat, absorbent materials, or using other suitable techniques).

In some implementations, the thin film 145 can be applied using an aqueous thin film solution. For example in some alternative implementations, once clip 100 is cured sufficiently, the clip 100 can be removed from a mold and submerged and soaked in a thin film solution of about 2.0 oz of water and 0.05 oz of a scented compound (e.g., essential oil or other suitable compound) for a predetermined amount of time (e.g., 24 hours or some other suitable amount of time). It should be appreciated that different scented compounds may require different soaking times for clip 100.

In some implementations, a suitable thin film solution of the scented compound can be sprayed on the clip 100 without soaking to form the thin film 145. In some implementations, the clip 100 is dipped into a suitable solution of a scented compound to coat the clip 100 without extended soaking time (e.g., less than 1 hour or some other suitable time) to form the thin film 145. In some implementations, the clip 100 is then allowed to dry with the coating of the solution of the scented compound to form the thin film 145. For example, the clip 100 can be passively air dried or mechanically dried. In some implementations, the material used to form the clip 100 (e.g., the polymeric material) may naturally include a microscopic uneven surface or a textured micro-surface that forms on the surface of clip 100 during curing. In some implementations, when the uncured material is mixed (e.g., combining two or more compounds to form the polymeric material), the mixing introduces some visible and microscopic air bubbles. In some implementations, such microscopic air bubbles may form on or near an outer surface of the material used to form the clip 100. In some implementations, these air bubbles may rupture, forming a microscopically uneven surface or a textured micro-surface around the outer surface of the clip 100. Accordingly, when the clip 100 is coated in a solution with scented or aromatic compounds and dried, the dried thin film solution may leave a thin film 145 of one or more scented compounds on the textured micro-surface of the clip 100. In some implementations, the microscopically uneven surface or a textured micro-surface may help a solution with scented or aromatic compounds better adhere to the clip 100. Since the clip 100 may have a microscopically uneven surface, the scented compounds in the thin film are durably disposed thereon, compared to a smooth surface. It should be appreciated that in some implementations where the clip 100 includes a smooth surface, such a thin film can also be deposited on a smooth surface of clip 100. It should be appreciated from the above discussion that the thin film can be prepared on the clip 100 using an aqueous or non-aqueous thin film solution in various different implementations. In some implementations, a suitable thin film solution is applied to the clip 100 and clip 100 and the thin film solution are heated to a temperature that allows polymer molecules of clip 100 to expand and trap compounds in the thin film solution in the surface and/or subsurface of clip 100 and forming a thin film 145 on clip 100. In some implementations, clip 100 is heated to a temperature that allows polymer molecules of clip 100 to expand and trap compounds on the surface and/or subsurface of clip 100 and a suitable thin film solution is thereafter applied to the heated clip 100. In such an implementation, when the heated clip 100 is allowed to cool, compounds in the thin film solution are trapped on the surface and subsurface of clip 100 and also allowed to form the thin film 145 on clip 100.

In some implementations, a length of time during which the scented compounds (formed as a thin film around clip 100) remain effective, such as having bug repellent properties or desirable aromas, is unexpectedly greater than when typically applied to a smooth surface. In some implementations, there may be a loss of intensity of the scented compounds in the clip 100 (whether embedded in the clip 100 or formed as a thin film around the clip 100) the more the scented compounds are exposed to air (e.g., through oxidation or through inadvertent mechanical removal). Thus, in some implementations, a thin film solution of scented compounds can be made available to users to revive the intensity of the scented compounds on clip 100. For example, the clip 100 can undergo additional coating with the solution of the scented compounds and drying. With the appropriate ratio of an aqueous or non-aqueous thin film solution with scented compounds, the coating process may be repeated in order to re-deposit a new scented compound thin film on the surface of the clip 100 and extend the effectiveness of the scented compound (for repelling bugs or providing a pleasant aroma to the user). In some implementations, a proper ratio of scented compounds (e.g., as previously discussed) in an aqueous or non-aqueous solution is important to avoid harmful effects of the scented compounds in certain applications. For example, if a full strength or undiluted solution of lavender essential oil is applied as a thin film to clip 100, clip 100 may be unusable when worn near a user's face (e.g., on a brim of a hat). The undiluted scented compound may cause a user's eyes to water as well as cause other unintended physiological effects.

Figure 5:
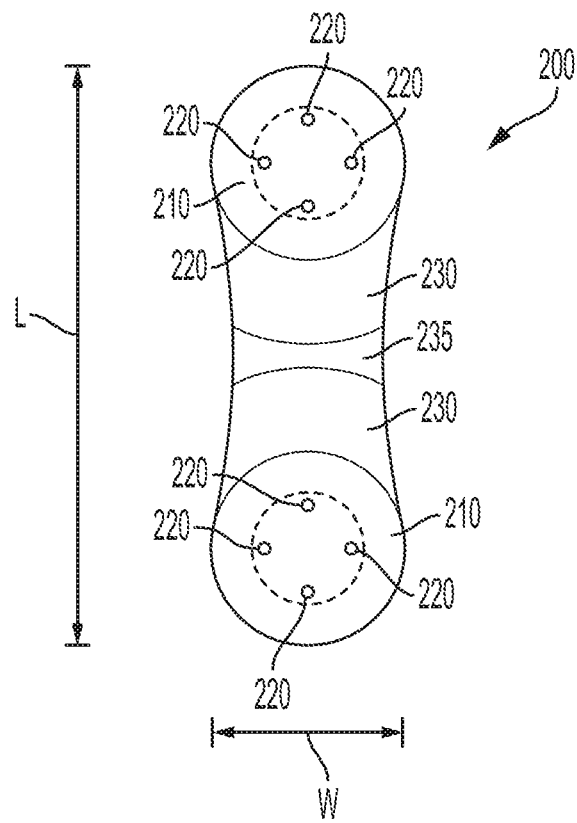
FIG. 5 is a top view showing one example implementation of a clip.
Figure 6:
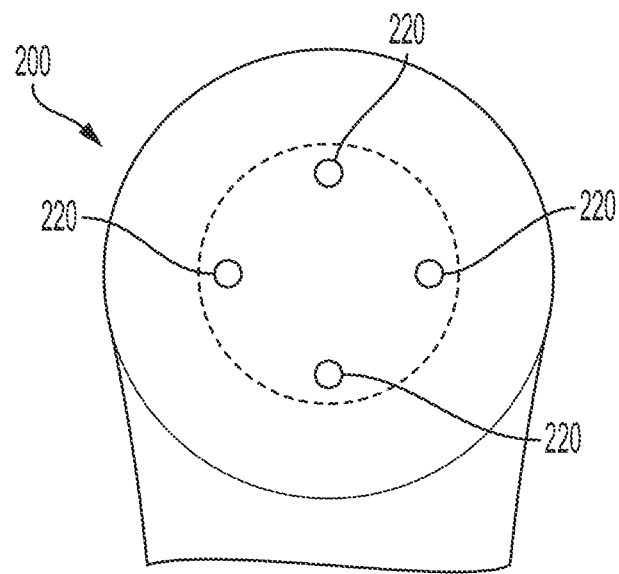
FIG. 6 is a close-up top view of one example implementation of the clip.
Figure 7:
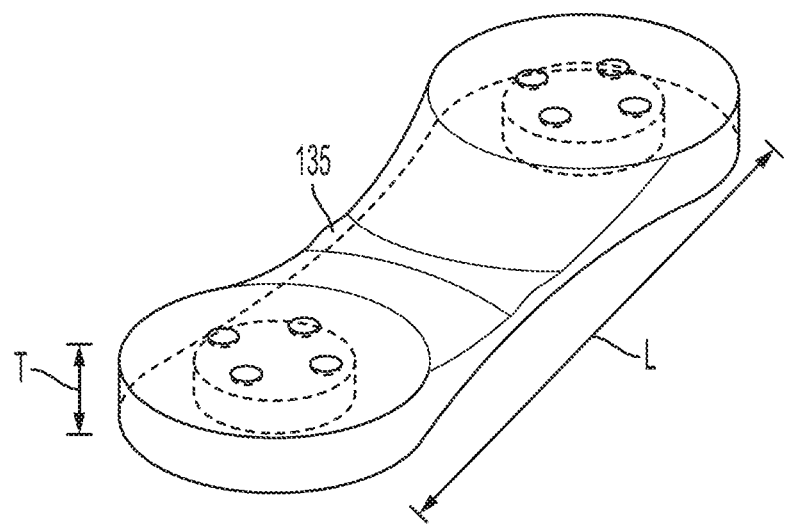
FIG. 7 is an isometric view of one example implementation of the clip.

According to some implementations, as shown in FIG. 5, FIG. 6, and FIG. 7, a flexible magnetic clip 200 includes two clip heads 210 having divots 220 disposed therein. The flexible magnetic clip 200 according to the present exemplary implementation may be substantially similar in various respects to the clip 100 as described above with respect to FIG. 1A, FIG. 1B, FIG. 2, FIG. 3, and FIG. 4 of the present application, and the method of forming the clip 100, and the disclosure thereof is incorporated herein by reference, and any repeated disclosure may be omitted for the sake of brevity. Likewise, the disclosure with respect to the flexible magnetic clip 200 described in connection with FIG. 5, FIG. 6, and FIG. 7 is incorporated by reference into the example implementation described with respect to FIG. 1A, FIG. 1B, FIG. 2, FIG. 3, and FIG. 4 above.

The clip 200 has a length L of about 60 mm and a width W of about 20 mm. It should be appreciated that other suitable lengths and widths can be used for clip 200. The clip heads 210 may each have a diameter of about 20 mm. It should be appreciated that other suitable diameters can be used for the clip heads 210. In some implementations, one or more clip heads 210 has divots 220 disposed therein. As illustrated, a clip head 210 may include four divots 220. In some implementations, a divot 220 can be about 2 mm in diameter. In some implementations, the four divots 220 in each clip head 210 are disposed in a diamond arrangement, substantially equidistant from each other, as shown in greater detail in FIG. 6. It should be appreciated that other arrangements of the divots 220 can be used. The divots 220 may be disposed within a 5 mm radius from the center of the clip head 210 in some implementations. In some implementations, each divot 220 can be respectively substantially equidistant from the side of the clip head 210. In some implementations, clip heads 210 may include one or more magnets such as described above in FIGS. 1A, 1B, 2, 3, and 4. In some implementations, each clip head 210 has a thickness T of about 4 mm, as shown in FIG. 7, and the bottom of the flexible magnetic clip 200 can be substantially planar and uniform, as shown in FIG. 4.

FIG. 9 is an isometric view of one implementation of a clip 100 secured to a brim of a hat 410. Clip 100 is shown folded around the brim of hat 410 where the attraction force of magnets within the clip heads of clip 100 removably secure the clip 100 to the hat. The clip 100 can be attached to other suitable items besides hats.

Figure 10:
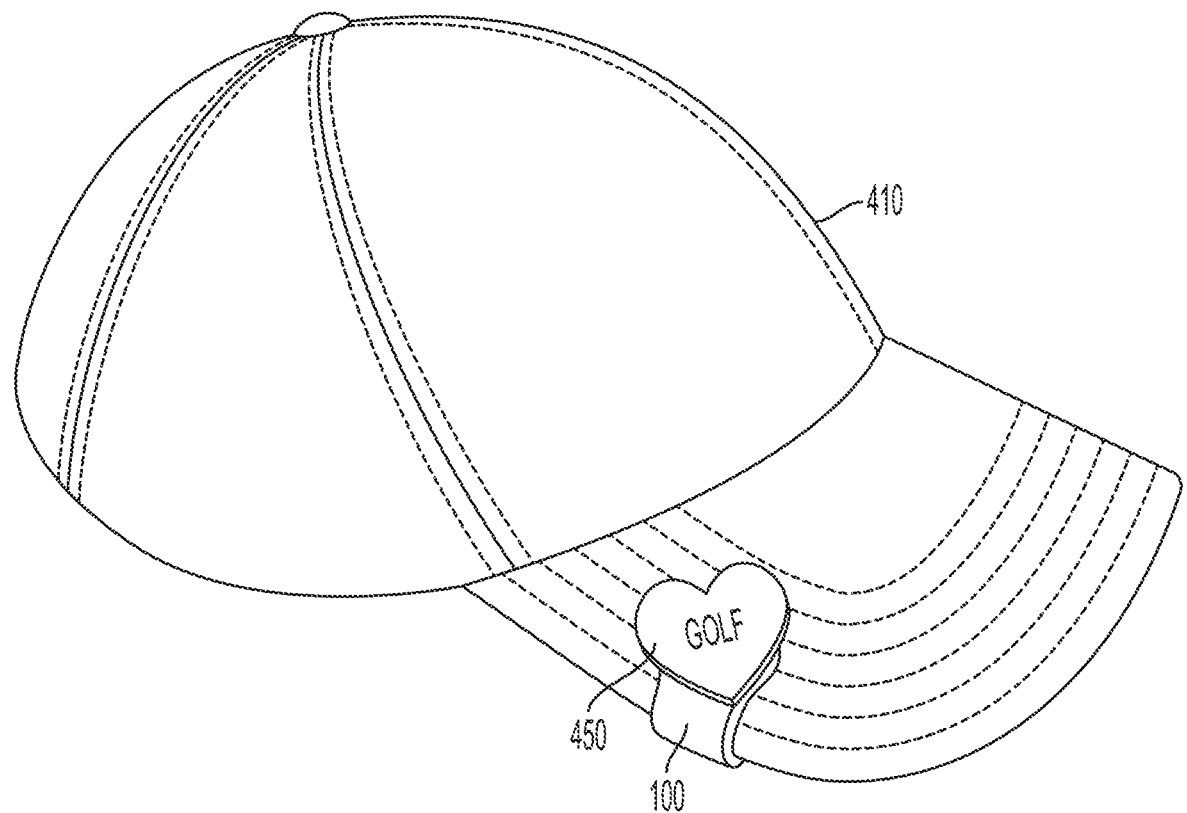
FIG. 10 is an isometric view of one example implementation of a clip secured to an article of clothing, where a ball marker is secured to the clip.

FIG. 10 is an isometric view of one implementation of a clip 100 secured to the hat 410, where a ball marker 450 is removably secured to the clip 100. The ball marker 450 may include a magnet or otherwise ferrous material that causes a magnet in clip 100 to removably secure the ball marker 450. As noted above, other suitable items can be attached to the clip 100, such as pens, fishing lures, etc. In addition to securely holding an object to the clip 100, when clip 100 includes an embedded or thin film of a scented compound, the clip 100 may also perform additional duties of repelling bugs or providing a deodorant or pleasant scent in an area surrounding the clip 100.

Figure 11:
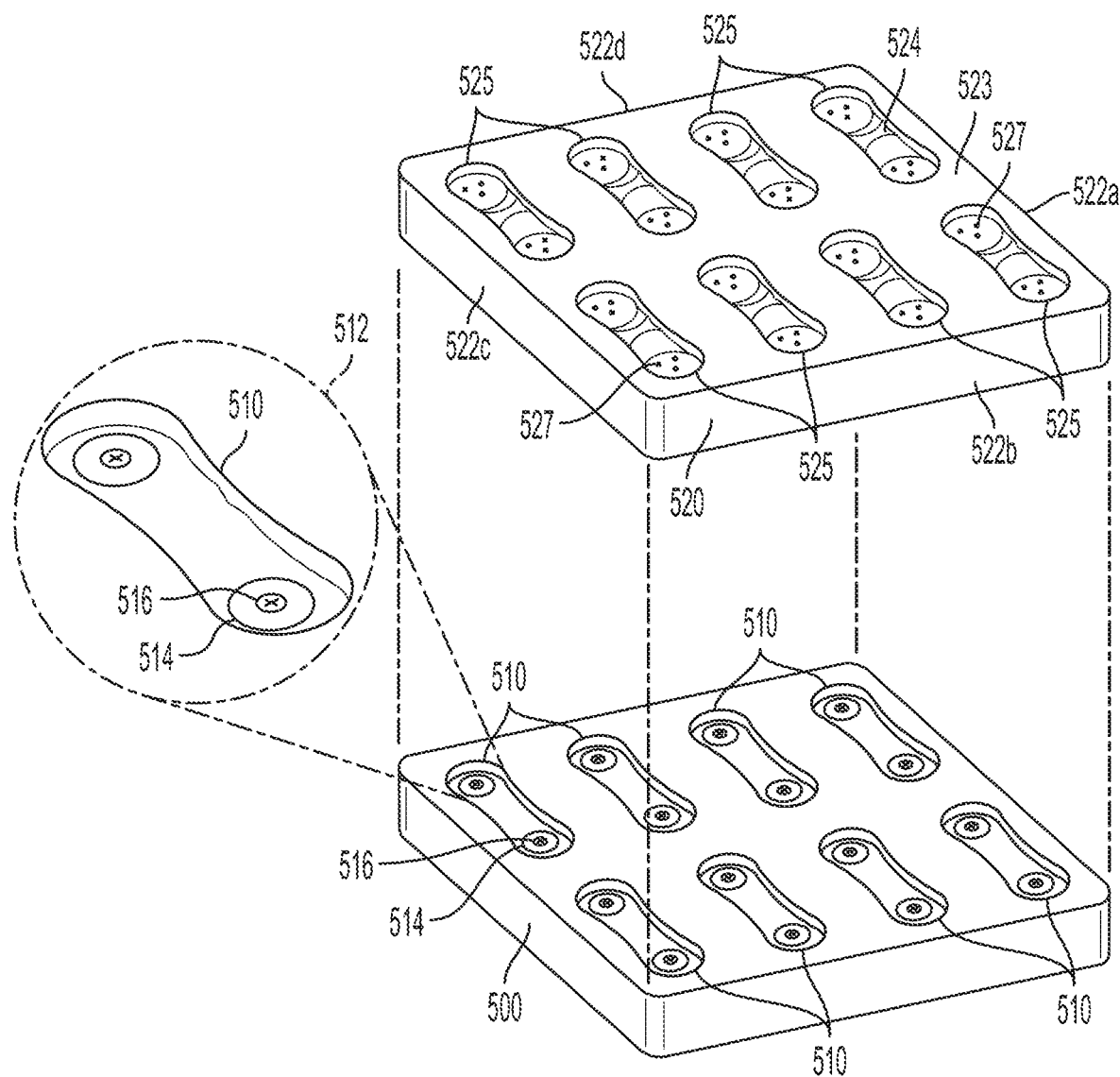
FIG. 11 is an isometric view of one example implementation of a mold and magnet orientation jig for making a clip.

FIG. 11 illustrates an isometric view of one example implementation of a mold and a magnet orientation jig for making one or more clips 100. In some implementations, the mold is stackable over the magnet orientation jig. In some implementations, one or more clips 100 can be made using mold 520 and magnet orientation jig 500. In some implementations, the mold 520 fits over top of the magnet orientation jig 500 and is removably fitted over top of the magnet orientation jig 500. In some implementations, the mold 520 can be formed from a polymer such as Acrylonitrile Butadiene Styrene (ABS), polyethylene (HDPE), or some other suitable polymer. In some implementations, mold 520 includes four sides 522a, 522b, 522c, and 522d that are connected to top 523. Together, the four sides 522a, 522b, 522c, and 522d and top 523 form a hollow cover that can fit over or otherwise stack on top of magnet orientation jig 500.

In some implementations, mold 520 includes one or more recessed areas 525 for accepting material to form clip 100 (e.g., magnets and uncured polymer). In some implementations, a recessed area 525 may include a first end and a second end that correspond to clip heads 110 of clip 100 when forming the clip 100. While mold 520 is displayed with eight recessed areas 525, mold 520 may be configured with fewer recessed areas 525 (e.g., 1 or more recessed areas 525) as well as more than eight recessed areas 525. In some implementations, recessed areas 525 include one or more partial spherical shapes 527 that slightly protrude into the recessed areas 525. In some implementations, the one or more partial spherical shapes 527 protrude into the recessed areas 525 less than 1 mm (or some other suitable amount of protrusion into the recessed areas 525). The partial spherical shapes 527 can be oriented in a variety of different ways (e.g., as points of triangles, squares, etc.) As was discussed above, these partial spherical shapes 527 may serve one or more purposes such as to help orient magnets placed in recessed area 525, allow polymer materials to flow underneath the magnets in recessed area 525, and/or form grip divots in the clip 100. It should also be appreciated that the partial spherical shapes can be formed using other suitable shapes. In some implementations, recessed areas 525 may include a raised area 524 that gradually increases and decreases in height between either end of a recessed area 525 (e.g., between one end with partial spherical shapes 527 and the other end with partial spherical shapes of a recessed area 525). It should be appreciated that in implementations with the raised area 524, the recessed areas 525 can form the relief 135 or sloped area T1 of clip 100, such as described above with respect to FIG. 1A or FIG. 3. While not visible, in some implementations, the underside of mold 520 is hollow and sized slightly larger than magnet orientation jig 500 such that mold 520 will removably fit over magnet orientation jig 500 and recessed areas 525 will sit within recessed areas 510 of the magnet orientation jig 500 (e.g., mold 520 is stacked over magnet orientation jig 500).

In some implementations, the magnet orientation jig 500 can be formed from wood, medium density fiberboard (MDF), a polymer, metal, or some other suitable material. In some implementations, the magnet orientation jig 500 is constructed from a solid material. However, in some implementations, magnet orientation jig 500 may be constructed similarly to the mold 525 (e.g., with four sides connected to a top). In some implementations, magnet orientation jig 500 is sized slightly smaller than mold 520 such that mold 520 will removably fit over magnet orientation jig 500 (e.g., mold 520 is stackable over magnet orientation jig 500). In some implementations, magnet orientation jig 500 includes one or more magnet jig recessed areas 510 that are capable of receiving recessed areas 525 of mold 520. While magnet orientation jig 500 is displayed with eight magnet jig recessed areas 510, magnet orientation jig 500 may be configured with fewer magnet jig recessed areas 510 (e.g., 1 or more magnet jig recessed areas 510) as well as more than eight magnet jig recessed areas 510.

In some implementations, as shown in exploded view 512, a magnet jig recessed area 510 may include one or more magnets 514 and one or more fasteners 516. In some implementations, the one or more magnets 514 are secured in a central area of one or more of the ends of the magnet jig recessed areas 510. In some implementations, it may be desirable to have magnets 105 centered in clip 100. In such implementations, where magnets 514 are centered within magnet jig recessed area 510, when magnets 105 are added to clip 100 during the formation process, magnets 105 will be attracted to, removably secured, and aligned within a substantially central position within clip heads 110 of clip 100. It should be appreciated that in alternative implementations, magnets 514 can be secured in positions offset from center or in any suitable position within magnet jig recessed area 510 in accordance with the desired placement of magnet 105 during the clip 100 formation process. In some implementations, each end of a magnet jig recessed area 510 includes a ring-shaped magnet 514 with an opening. In some implementations, the ring-shaped magnet 514 is secured to magnet orientation jig 500 with a fastener 516 (e.g., a screw). It should be appreciated that in some implementations, magnet 514 can be secured to the magnet orientation jig 500 with an alternative fastener (e.g., an adhesive or other suitable mechanical fastener). In some implementations, magnets 514 in one magnet jig recessed area 510 may include opposite polarities on the exposed surfaces shown in FIG. 11. The opposing polarities on the exposed surfaces of magnets 514 in one magnet jig recessed area 510 can ensure that magnets (e.g., magnets 105) added to the clip heads (e.g., clip heads 110) to form a clip 100 are oriented with the correct polarity (e.g., so that the clip heads 110 of a cured clip 100 will properly clamp together). It should be appreciated that in some implementations, magnet orientation jig 500 does not use fasteners 516. In some implementations, magnet orientation jig 500 may use one or more further recessed areas (not shown) within magnet jig recessed area 510 to removably secure and position magnet 514, where the further recessed areas are sized to fit magnet 514 without magnet 514 sliding around.

The following is a description of using the combination of the mold 510 and the magnet orientation jig together to form one or more clips 100. In some implementations, a mold release agent can be pre-applied to the mold 520 to help ensure release of materials added to the mold. In some implementations, the mold 520 is placed over the magnet orientation jig 500 such that mold 520 covers the magnet orientation jig 500 and that recessed areas 525 of the mold 520 can rest within magnet jig recessed areas 510. In some implementations, at least some portions of the underside surface of mold 520 are in direct contact with at least some portions of the surface of magnet orientation jig 500. However, in some implementations, contact between these surfaces is not necessary so long as the strength of the magnets 514 is sufficient to properly orient and secure magnets that are placed in the mold 520 (e.g., magnets 105). In some implementations, when the mold 520 is arranged to cover the magnet orientation jig 500, a polymer compound with desired tinting or coloring is prepared and added to the mold 520. In some implementations, the polymer may include added scent/aromatic compounds when appropriate, as was previously discussed. In some implementations, one or more recessed areas 525 are partially filled with the polymer compound without substantially filling the one or more recessed areas 525. It should be appreciated is some implementations, one or more recessed areas 525 are substantially filled with the polymer compound. In some implementations, after partially filling the one or more recessed areas 525 with the polymer compound, a magnet (e.g., magnet 105) is added at least one end (or both ends) of one or more of the recessed areas 525. In some implementations, the magnets 514 of the magnet orientation jig 500 will ensure that a magnet 105 placed in mold 520 is positioned centrally with respect to the magnet 514 and that the correct polarity of magnet 105 is facing magnet 514. To the extent that magnet 105 is repelled by magnet 514, then magnet 105 should be flipped 180 degrees within recessed area 525. It should be appreciated that magnets 105 placed in recessed areas 525 may rest on the partial spherical shapes 527. In some implementations, if one or more recessed areas 525 are partially filled, additional polymer can be added to cover the magnets 105 or to otherwise achieve the desired thickness T of a clip 100. In some implementations, the polymer added to the one or more recessed areas 525 in mold 520 are allowed to sufficient cure (e.g. for 8 hours or the appropriate cure period for the polymer used to form clips 100). In some implementations, clips 100 are removed from the mold 520 and tested to ensure proper flexibility and clamp strength (e.g., clips 100 may be removably secured to brim of a hat or a belt). Thus, it should be appreciated that when mold 520 is used in combination with magnet orientation jig 510, the combination provides a simple tool to quickly and accurately form clips 100.

It should also be appreciated that mold 520 can be constructed with one or more of the features of magnet orientation jig 500 to eliminate the use of magnet orientation jig 500. For example, in some implementations, mold 520 may include magnet 514 secured to the underside of recessed areas 525 in desirable positions so that when magnet 105 are placed in the mold 520, magnets 105 are properly positioned (e.g., centered and oriented with the correct polarity) in the same manner as using magnet orientation jig 500. In some implementations, magnets 514 are not used with mold 520. For example, in some implementations, mold 520 may include one or more further recessed areas (not shown) within recessed area 525 to secure and position magnets 105, where such further recessed areas are sized to fit magnets 105 without magnets 105 sliding around in recessed areas 525 within mold 520. In some implementations, the partial spherical shapes 527 can be contained within such further recessed areas. Moreover, the polarity of magnets 105 can be color coded or otherwise marked so that placement of the magnet 105 in the mold 520 can be easily discerned without requiring magnets 514 to determine polarity orientation of magnets 105. Thus, mold 520 can be further simplified and used without magnet orientation jig 500 in some implementations.

FIG. 12 are further nonlimiting example implementations of various clips formed in different shapes. Clip 610a illustrates an alternative example of clip 100 with triangular shaped clip heads rather than circular clip heads. Clip 610b illustrates an alternative example of clip 100 with heart shaped clip heads rather than circular clip heads. Clip 610c illustrates an alternative example of clip 100 with square shaped clip heads rather than circular clip heads. Clip 610d illustrates an alternative example of clip 100 with star shaped clip heads rather than circular clip heads. It should be appreciated that clip heads of a clip 100 may include different shaped clip heads (e.g., a circle clip head on one end and a star shaped clip head on an opposite end of a clip 100). In some implementations, each end of clip 100 may include more than one clip head. While the illustrated clip heads in FIG. 12 show distinct ridges between the clip heads and a center connecting portion between two clip heads, it should be appreciated that in some implementations, the clips do not include these distinct ridges and may include smooth transitions between the clip heads and the center connection portion of the clips, similar to the clips described above in FIG. 1A and FIG. 7.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the disclosure. It is also to be understood that the terminology used herein is for the purpose of describing particular implementations and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the disclosure may contain usage of the introductory phrases "at least one" and "one or more" to introduce recitations. However, the use of such phrases should not be construed to imply that the introduction of a recitation by the indefinite articles "a" or "an" limits any particular feature containing such introduced recitation to implementations containing only one such recitation, even when the same recitation includes the introductory phrases "one or more" or "at least one" and indefinite articles such as "a" or "an" (e.g., "a" and/or "an" should be interpreted to mean "at least one" or "one or more"); the same holds true for the use of definite articles used to introduce recitations. In addition, even if a specific number of an introduced recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the have been described. Various modifications may be made without departing from the spirit and scope of the disclosure. For example, various forms of the processor disclosed above may be used, with steps re-ordered, added, or removed.

What is claimed is:
1. A clip comprising:
a body having an outer surface;
a first end of the body having an inner face;
a second end of the body having an inner face;
a first magnetically attractable element positioned at least partially within the body at the first end, where a polarity of the first magnetically attractable element at the inner face of the first end is a first polarity;
a second magnetically attractable element positioned at least partially within the body at the second end, where a polarity of the second magnetically attractable element at the inner face of the second end is a second polarity;
a tapered midsection of the body; and
a thin film deposited on the outer surface of the body, wherein the thin film comprises aromatic compounds.

2. The clip of claim 1, wherein the body is a flexible polymer.

3. The clip of claim 2, wherein the flexible polymer comprises silicone.

4. The clip of claim 1, wherein the first polarity is an opposite polarity of the second polarity such that the inner face of the first end and the inner face of the second end are magnetically attracted to each other and form a clamp.

5. The clip of claim 1, wherein the aromatic compounds comprise organic compounds.

6. The clip of claim 5, wherein the organic compounds further comprise cassia bark powder.

7. The clip of claim 5, wherein the organic compounds further comprise vanillin powder.

8. The clip of claim 5, wherein the organic compounds further comprise a ratio of two different organic compounds.

9. The clip of claim 8, wherein the ratio of organic compounds is 2:1.

10. The clip of claim 8, wherein the ratio of organic compounds is two parts vanillin powder to one part cassia bark powder.

11. The clip of claim 1, wherein the thin film comprises compounds that repel insects.

12. The clip of claim 1, wherein the outer surface of the body comprises a textured micro-surface and wherein the thin film adheres to textured micro-surface.

13. The clip of claim 1, wherein the first end further comprises at least one divot.

14. The clip of claim 1, wherein the first end comprises an outer face and wherein the outer face removably secures a ferromagnetic object.

15. A clip comprising:
a body having an outer surface;
a first end of the body having an inner face and an outer face, wherein the outer face removably secures a ferromagnetic object;
a second end of the body having an inner face;
a magnetically attractable element positioned at least partially within the body at the first end;
a ferromagnetic element positioned at least partially within the body at the second end; and
a thin film deposited on the outer surface of the body.

16. The clip of claim 15, wherein the body is a flexible polymer.

17. The clip of claim 16, wherein the flexible polymer comprises silicone.

18. The clip of claim 15, wherein the magnetically attractable element in the first end causes the inner face of the first end to magnetically attract the inner face of the second end and form a clamp.

* * * * *